(12) United States Patent
Marshall et al.

(10) Patent No.: US 8,379,382 B2
(45) Date of Patent: Feb. 19, 2013

(54) DOCKING STATION

(75) Inventors: Michael Lewis Marshall, Washington, DC (US); Yenny Paola Moya, Silver Spring, MD (US); Paul Daniel Alston, Stone Mountain, GA (US)

(73) Assignee: inNuevo, LLC, Washington, DC (US)

( * ) Notice: Subject to any disclaimer, the term of this patent is extended or adjusted under 35 U.S.C. 154(b) by 116 days.

(21) Appl. No.: 13/088,965

(22) Filed: Apr. 18, 2011

(65) Prior Publication Data
US 2012/0262866 A1 Oct. 18, 2012

(51) Int. Cl.
*G06F 1/16* (2006.01)
(52) U.S. Cl. ........... 361/679.41; 361/679.02; 361/679.3; 361/679.58; 312/223.1; 312/223.2; 206/320
(58) Field of Classification Search .............. 361/679.41
See application file for complete search history.

(56) References Cited

U.S. PATENT DOCUMENTS

| | | | |
|---|---|---|---|
| D323,156 S | 1/1992 | Nishida | |
| 5,100,098 A * | 3/1992 | Hawkins | 248/291.1 |
| D356,072 S | 3/1995 | Mundt | |
| D369,147 S | 4/1996 | Iino et al. | |
| 5,638,257 A * | 6/1997 | Kumar et al. | 361/679.56 |
| 5,826,840 A | 10/1998 | Yun | |
| 5,966,284 A | 10/1999 | Youn et al. | |
| 6,028,764 A | 2/2000 | Richardson et al. | |
| 6,212,066 B1 | 4/2001 | Fetterman | |
| D443,610 S | 6/2001 | Lo | |
| 6,561,349 B2 * | 5/2003 | Lee | 206/320 |
| D491,933 S | 6/2004 | Guo | |
| 6,937,468 B2 | 8/2005 | Lin et al. | |
| 6,976,799 B2 * | 12/2005 | Kim et al. | 400/472 |
| 6,999,008 B2 * | 2/2006 | Wang et al. | 341/22 |
| 7,025,274 B2 | 4/2006 | Solomon et al. | |
| D521,002 S | 5/2006 | Rinna et al. | |
| 7,298,610 B2 | 11/2007 | Kim et al. | |
| D580,432 S | 11/2008 | Yun et al. | |
| 7,499,270 B2 * | 3/2009 | Allen | 361/679.56 |
| D593,091 S | 5/2009 | Behar et al. | |
| D599,792 S | 9/2009 | Lin | |
| 7,618,065 B2 * | 11/2009 | Yau | 281/29 |
| D611,467 S | 3/2010 | Gou | |
| D615,538 S | 5/2010 | Huang et al. | |
| D626,129 S | 10/2010 | Lutz | |
| D630,221 S | 1/2011 | Sogabe et al. | |
| D643,842 S * | 8/2011 | Marshall et al. | D14/434 |
| 8,230,992 B2 * | 7/2012 | Law et al. | 206/320 |
| 2002/0080567 A1 | 6/2002 | Bone | |
| 2009/0194445 A1 | 8/2009 | Mongan et al. | |
| 2011/0026749 A1 | 2/2011 | Yaun | |

* cited by examiner

*Primary Examiner* — Anthony Q Edwards
(74) *Attorney, Agent, or Firm* — Law Office of Peter G. Korytnyk, PLLC

(57) ABSTRACT

A holder for an oblong-shaped device is provided. The holder can be a docking station for a media device and a keyboard. The holder can include a mounting tray and a mounting bracket assembly arranged on the mounting tray. The mounting bracket assembly can be configured such that the oblong-shaped device is securable to the mounting tray in both (i) a first position where a longitudinal axis of the oblong-shaped device extends substantially horizontally, and (ii) a second position where the longitudinal axis of the oblong-shaped device extends substantially vertically while the mounting tray is kept in a substantially upright position.

10 Claims, 6 Drawing Sheets

DOCKING STATION

FIELD OF THE INVENTION

The present teachings relate to a holder for a media device. In particular, the present teachings relate to a docking station holder for use with a media device and a keyboard. The docking station provides adjustable positioning and support for the media device to achieve user comfort during use.

BACKGROUND OF THE INVENTION

Currently known holders for media devices do not allow a user an extensive amount of positional flexibility when used in a laptop-style position with a keyboard. For example, known holders only allow the media device to be securely held in either one of a landscape mode or a portrait mode. Moreover, known holders permit the media device to be positioned only in preset angled positions with respect to the keyboard. By providing such a limited amount of adjustability, known holders prevent users from finding a working position that provides a maximum amount of comfort thereby jeopardizing work efficiency.

Accordingly, there exists a need for a holder for a media device that can be readily adjusted by a user so as to be supportable in both a landscape mode and a portrait mode. The need for ease of adjustability in such a holder also extends to setting the angled position of the media device with respect to the keyboard.

SUMMARY OF THE INVENTION

The present teachings provide a holder for an oblong-shaped device. The holder can include a mounting tray and a mounting bracket assembly arranged on the mounting tray. The mounting bracket assembly can be configured such that the oblong-shaped device is securable to the mounting tray in both (i) a first position where a longitudinal axis of the oblong-shaped device extends substantially horizontally, and (ii) a second position where the longitudinal axis of the oblong-shaped device extends substantially vertically while the mounting tray is in a substantially upright position.

The present teachings further provide a docking station including a keyboard tray and a mounting tray. The mounting tray can include a mounting bracket assembly arranged thereon. A connector can be arranged to pivotally connect the keyboard tray to the mounting tray. The mounting bracket assembly can be configured such that an oblong-shaped device is securable to the mounting tray in both a landscape mode and a portrait mode while the mounting tray is kept stationary.

The present teachings still further describe a docking station for an oblong-shaped device. The docking station includes a keyboard tray and a mounting tray including a mounting bracket assembly arranged thereon. A connector can be arranged to pivotally connect the keyboard tray to the mounting tray. The mounting bracket assembly can be configured such that the oblong-shaped device is securable to the mounting tray in both (i) a first position where a longitudinal axis of the oblong-shaped device extends substantially horizontally, and (ii) a second position where the longitudinal axis of the oblong-shaped device extends substantially vertically while the mounting tray is kept in a substantially upright position.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings relate to a holder that is intended to be used with a media device but could be used with any substantially planar device that is to be supported in a position for convenient viewing by a user. The holder can be in the form of a docking station that can include an area for accepting the media device and an area for accepting a keyboard that is to be used with the media device. When the media device and keyboard are held in the docking station, the keyboard can interface with the media device in a wired or wireless manner. The media device can be any substantially planar electronic device, such as a tablet PC, e-book reader, smartphone, or any other hardware device having a display.

Figure 1:
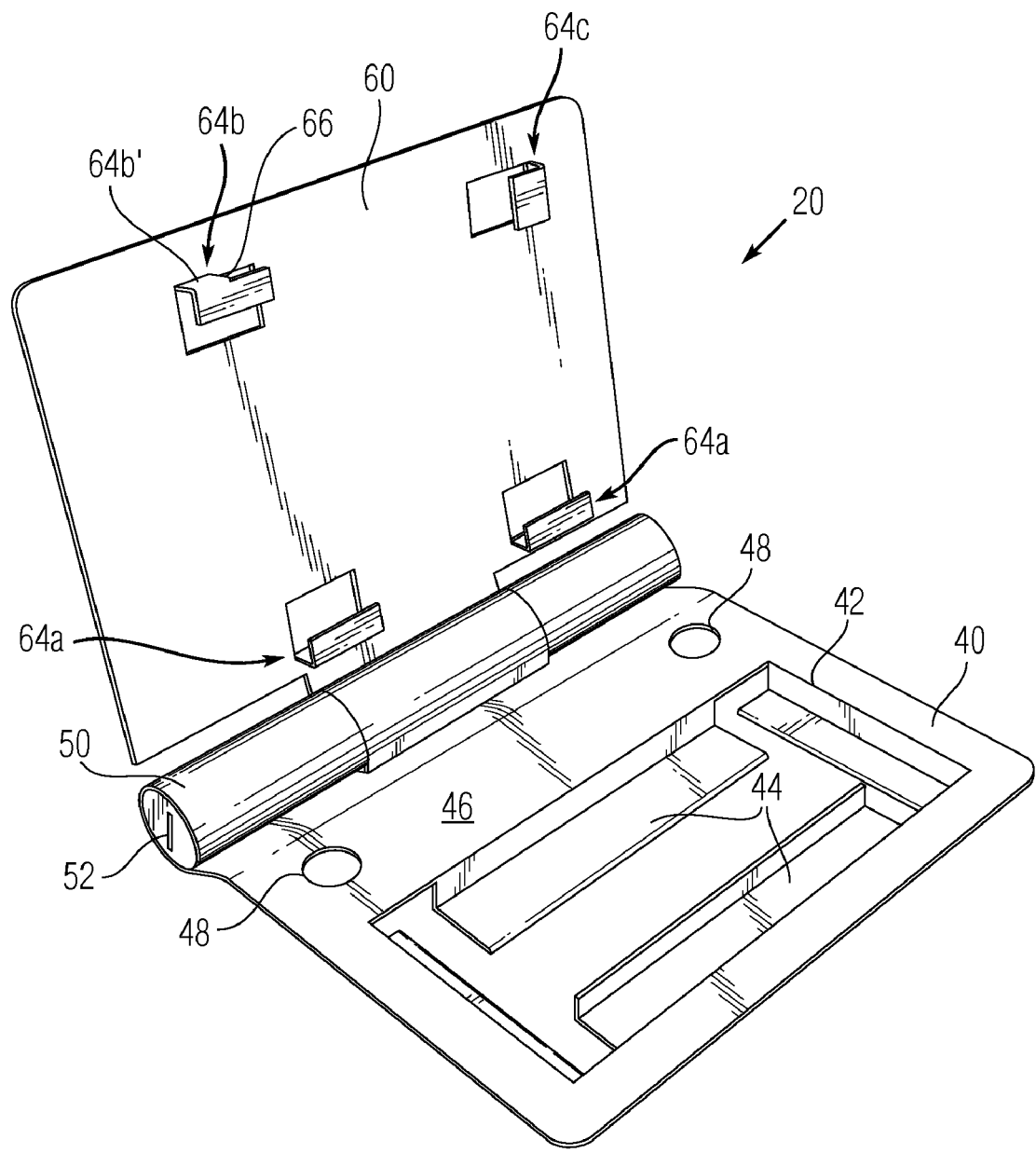
FIG. 1 shows a perspective view of a docking station according to the present teachings being arranged in an open position.

Referring to FIG. 1, the holder 20 of the present teachings can be a docking station including a keyboard tray 40, a mounting tray 60, and a connector 50. The connector 50 can be arranged to provide an adjustable pivotable connection between the keyboard tray 40 and the mounting tray 60. For example, the connector 50 can be a pivotable hinge arranged between the keyboard tray 40 and the mounting tray 60.

Figure 2:
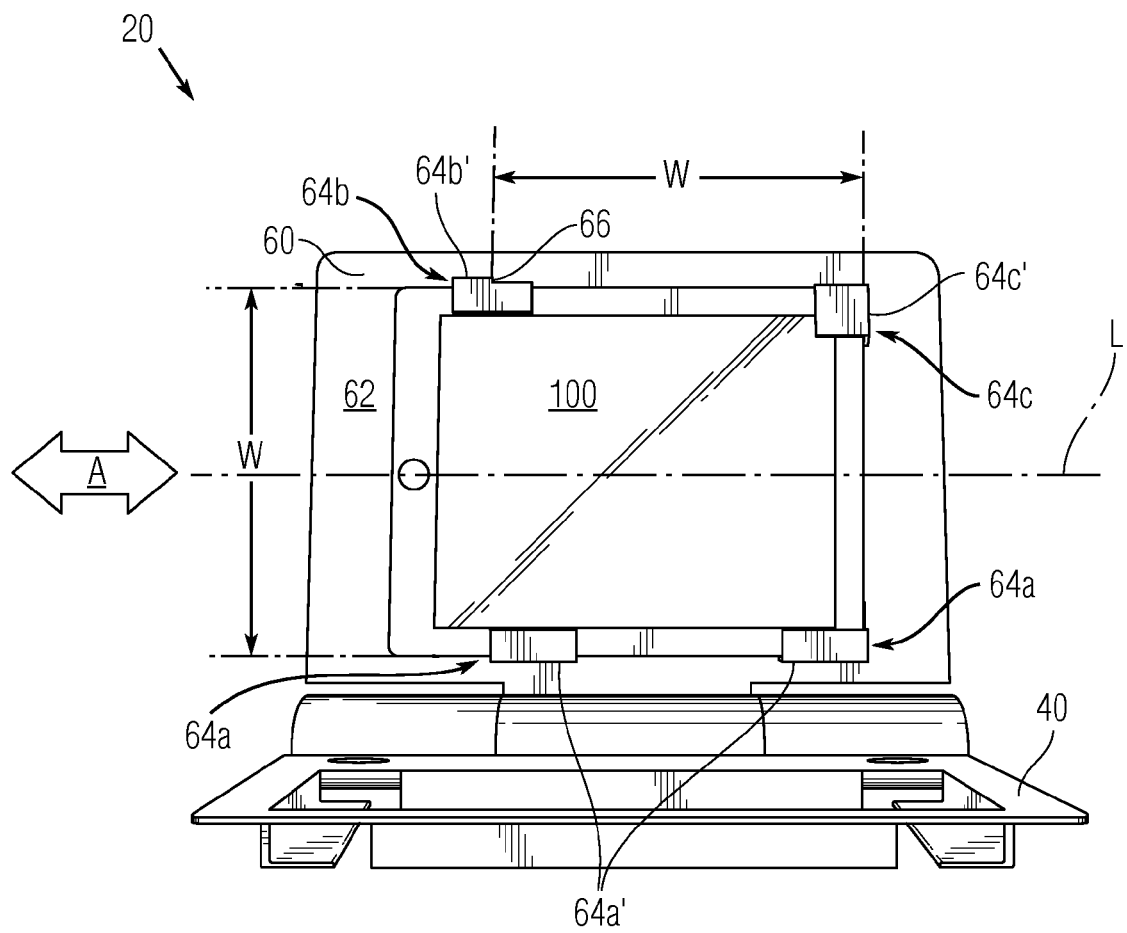
FIG. 2 shows a front perspective view of the docking station of the present teachings with a media device being held in a landscape mode.
Figure 3:
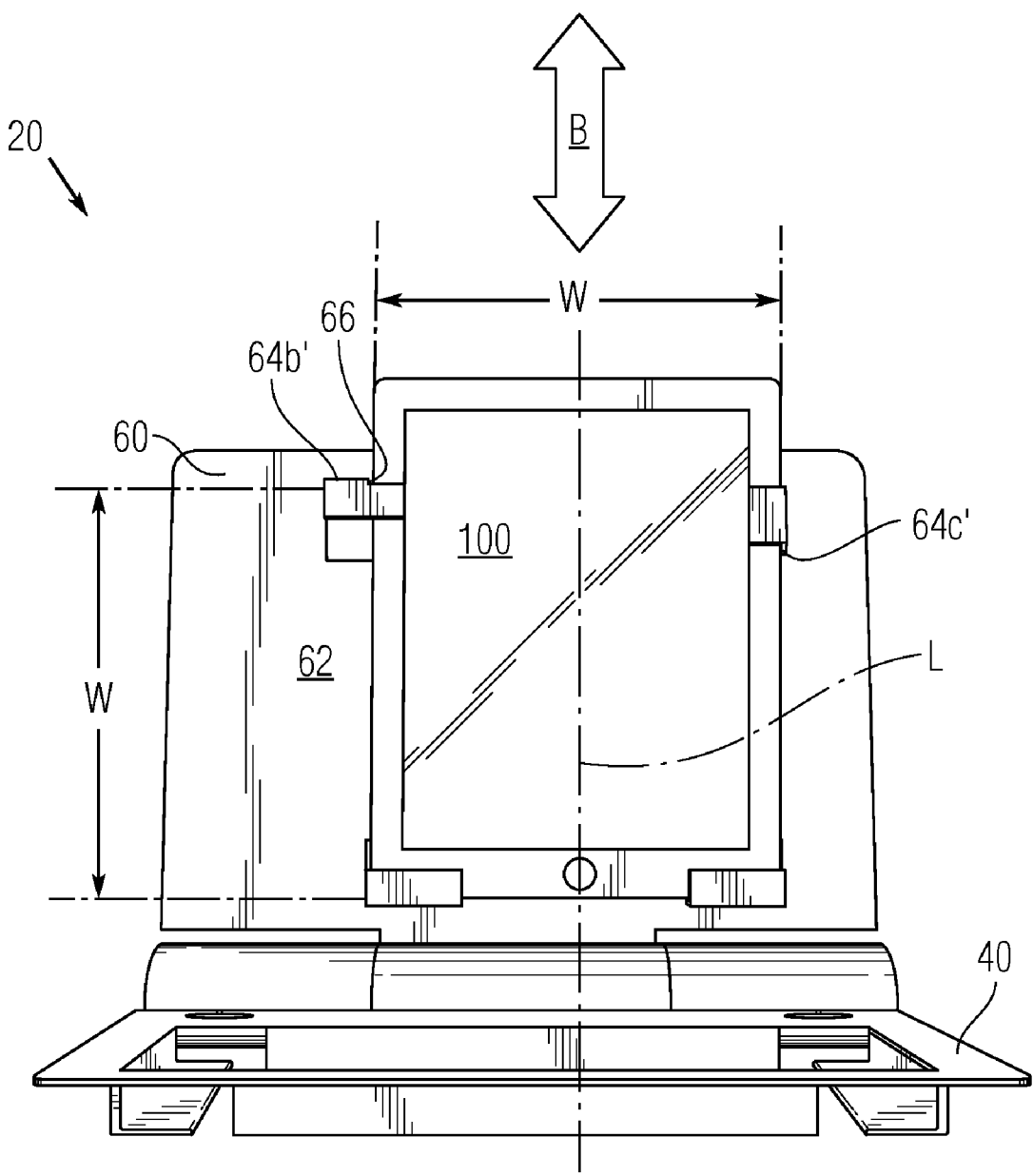
FIG. 3 shows a front perspective view of the docking station of the present teachings with a media device being held in a portrait mode.

In each of FIGS. 1-3, the docking station 20 is shown in an open position as it would be typically used. In such an open position, the mounting tray 60 is arranged to extend substantially vertically (or slightly beyond a vertical position) with respect to the keyboard tray 40. The mounting tray 60 can include a mounting bracket assembly for supporting and securing a media device 100 to the mounting tray 60. The mounting bracket assembly can include a plurality of mounting brackets. For example, the plurality of mounting brackets can include one or more base mounting brackets 64a, a first upper mounting bracket 64b, and a second upper mounting bracket 64c.

Figure 4:
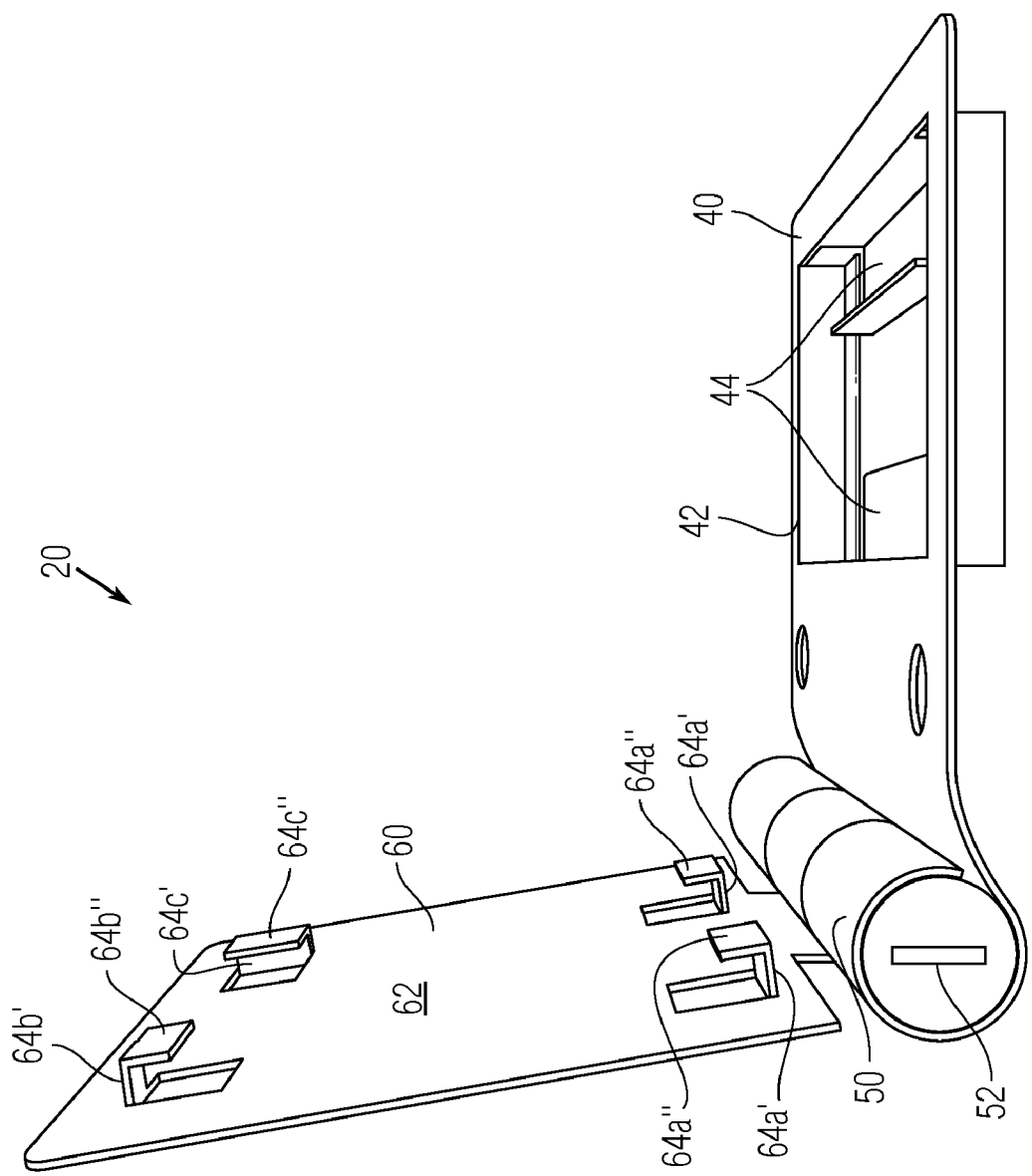
FIG. 4 shows a left side perspective view of the docking station of FIG. 1.
Figure 5:
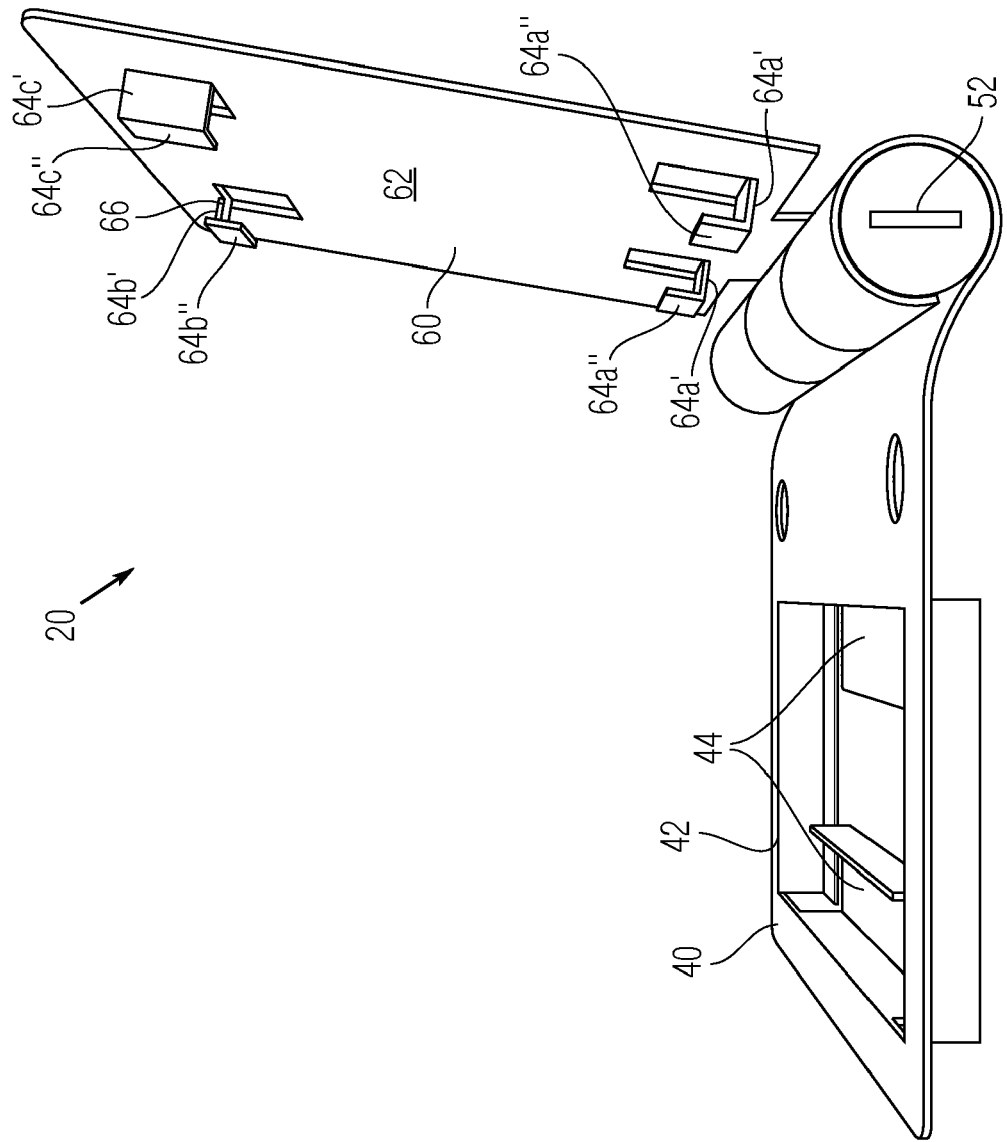
FIG. 5 shows a right side perspective view of the docking station of FIG. 1.

The mounting bracket assembly can be shaped and arranged so as to support and secure an oblong-shaped device 100 both horizontally as shown in FIG. 2 (i.e. in a landscape mode) and vertically as shown in FIG. 3 (i.e. in a portrait mode) on the mounting tray 60. More particularly, the mounting bracket assembly can be configured such that an oblong-shaped device 100 is supportable on the mounting tray 60 in both (i) a first position where a longitudinal axis, L, of the device 100 extends substantially horizontally, and (ii) a second position where the longitudinal axis, L, of the oblong-shaped device extends substantially vertically while the mounting tray 60 is kept stationary and in a substantially upright position As best shown in FIGS. 4 and 5, each of the mounting brackets 64a, 64b, 64c of the mounting bracket assembly can be formed by a projecting member 64a', 64b', 64c' extending outwardly from a surface 62 of the mounting tray 60 and a flange member 64a", 64b", 64c" extending at an angle with respect to the corresponding outwardly projecting member. For example, a projecting member 64a' can extend substantially perpendicularly to the surface of the mounting tray 60 while the corresponding flange member 64a" can extend substantially perpendicularly to the corresponding projecting member 64a'. However, the mounting brackets 64a, 64b, 64c can take other shapes, such as a curved C-shape, or any other shape that operates to extend from the mounting tray 60 and act as clamp to secure the media device 100 to the mounting tray 60. The mounting bracket assembly can be non-adjustably arranged on the mounting tray 60. Moreover, while the mounting brackets 64a, 64b, 64c are each shown as unitary L-shaped flanges, one or more of the mounting brackets can be formed in multiple parts such that any particular mounting flange can be formed as a non-unitary structure. For example, a mounting bracket can take the form of a plurality of flanged studs extending from the surface of the mounting tray 60.

The base mounting brackets 64a can be used to support the weight of the media device notwithstanding which position the media device 100 is being held. In particular, the projecting members 64a' of each of the base mounting brackets 64a can be arranged to extend substantially horizontally and sequentially along a bottom portion of the mounting tray 60. While the use of two base mounting brackets 64a is shown, one elongated base mounting bracket 64a (or three or more) could be incorporated into the holder 20 according to various embodiments.

The first upper mounting bracket 64b is shaped and arranged so as to act as a guide whether the media device is slid horizontally or vertically onto the mounting tray 60. In particular, the projecting member 64b' of mounting bracket 64b can be arranged to extend substantially horizontally and in parallel with the projecting members 64a' of mounting brackets 64a. Referring to FIGS. 2 and 3, the distance, W, between the leftmost base mounting bracket 64a and the first upper mounting bracket 64b (more specifically, the shortest distance between the inner surface of leftmost projecting member 64a' and oppositely arranged inner surface of projecting member 64b') can substantially correspond to the width of the media device 100 in order to securely hold the media device 100 horizontally in a landscape mode. According to various embodiments, the value of the distance, W, can vary depending on the dimensions of the media device 100 that is to be supported by the holder 20.

FIG. 2 shows a media device 100 held and secured horizontally on the mounting tray 60 by way of the mounting bracket assembly. The arrow, A, shows that the media device 100 can be slid sideways in a substantially horizontal direction along a longitudinal axis, L, of the media device 100 onto the mounting bracket assembly. The media device 100 is slid on the surface 62 of the mounting tray 60 from left to right in FIG. 2 with its width being guided between the base mounting brackets 64a and the first upper mounting bracket 64b. The media device 100 can be slid along the base mounting brackets 64a until the media device 100 abuts against the inner surface of the projecting member 64c' of the second upper mounting bracket 64c which acts as a stop. In this position, the media device is supported horizontally on the mounting tray 60 by the mounting bracket assembly in a landscape mode. When it is desired to remove the media device from the docking station 20, the media device can be slid sideways from right to left and along the base mounting brackets 64a until it is removed and separated from the mounting tray 60.

As previously discussed above, the projecting member 64b' of the first upper mounting bracket 64b can also act as a guide as the media device 100 is slid vertically onto the mounting tray 60. This is achieved by an inner end 66 of the projecting member 64b' being arranged at the distance, W, from the inner surface of projecting member 64c' of the second upper mounting bracket 64c. Moreover, the projecting member 64c' of the second upper mounting bracket 64c can be arranged to extend substantially vertically (i.e. substantially perpendicularly to the projecting member 64b' of the first upper mounting bracket 64b) along a side portion of the mounting tray 60. The distance, W, between the inner end 66 of the projecting member 64b' and the inner surface of projecting member 64c' can substantially correspond to the width of the media device 100 to provide a secure fit when the media device 100 is held vertically in a portrait mode.

FIG. 3 shows a media device 100 held and secured vertically on the mounting tray 60 by way of the mounting bracket assembly. The arrow, B, shows that the media device 100 can be slid vertically onto the mounting tray 60 from top to bottom along a longitudinal axis, L, of the media device 100 onto the mounting bracket assembly. The media device 100 is first slid on the surface 62 of the mounting tray 60 between the inner end 66 of the projecting member 64b' and the inner surface of projecting member 64c' of second upper mounting bracket 64c until the media device abuts the projecting members 64a' of base mounting brackets 64a. The media device 100 can be prevented from moving leftwards by the inner end 66 of projecting member 64b' while also being prevented from moving rightwards by the inner surface of projecting member 64c' of second upper mounting bracket 64c. In this position, the media device 100 is supported vertically on the mounting tray 60 by the mounting bracket assembly in a portrait mode. When it is desired to remove the media device 100 from the docking station 20, the media device can be slid upwardly between first and second upper mounting brackets 64b and 64c until it is removed and separated from the mounting tray 60.

When the media device 100 is supported in either of a landscape mode or a portrait mode, the flange members 64a", 64b", and 64c" of the respective mounting brackets 64a, 64b, 64c prevent the media device from moving too far forwardly and separating from the mounting tray 60 thereby securing or clamping the media device 100 to the mounting tray 60. With respect to the flange member 64b" of the first upper mounting bracket 64b, it can be arranged to extend beyond the width of its corresponding projecting member 64b' so as to allow it to operate as a securing stop or clamp in both a landscape mode and a portrait mode, see FIG. 1. According to various embodiments, the shapes of the first upper mounting bracket 64b and the second upper mounting bracket 64c can be reversed such that the media device can be slid from right to left onto the mounting tray 60 when supported in the landscape mode.

As shown in FIG. 1, the keyboard tray 40 can include an aperture 42 for receiving a keyboard. One or more keyboard brackets 44 can be arranged in the vicinity of the aperture 42 to provide support for the keyboard. The keyboard brackets 44 can be arranged in a manner so that a keyboard can be securely supported within the aperture 42 while being held so as to be substantially immobilized as keys are being clicked on the keyboard by a user. In a preferred embodiment, the keyboard brackets 44 can be arranged to support the keyboard so that a top surface thereof is substantially flush with a top surface 46 of the keyboard tray 40. According to various embodiments, the keyboard brackets 44 can be any structure for supporting a keyboard with the keyboard tray 40. The keyboard brackets 44 can vary in shape and arrangement depending on the design of the keyboard being used with the docking station 20. The keyboard brackets 44 can be adjustable so as to provide support for a variety of different keyboard designs.

The keyboard tray 40 can include one or more apertures 48 extending through a top surface 46 of the keyboard tray 40. The apertures 48 can be arranged to allow cables to be threaded therethrough for use with, for example, one or more AC adapters or wired peripherals. The apertures 48 can allow the cables to be neatly organized and can prevent them from hindering the view of the user or interfering with the use of the media device and/or keyboard.

The connector 50 arranged between the keyboard tray 40 and the mounting tray 60 can act as a hinge between the keyboard tray 40 and the mounting tray 60 to allow the angular orientation of the mounting tray 60 to be adjusted with respect to the keyboard tray. The connector 50 can include a locking mechanism 52 so that the angular positioning of the docking station 20 can be held at any user specified angle to ensure viewing of the media device 100 at any preferred angle. As would be appreciated by one of ordinary skill in the art, the locking mechanism 52 can be any device that can rotationally secure a hinge at a specified angle, such as a lock screw.

Figure 6:
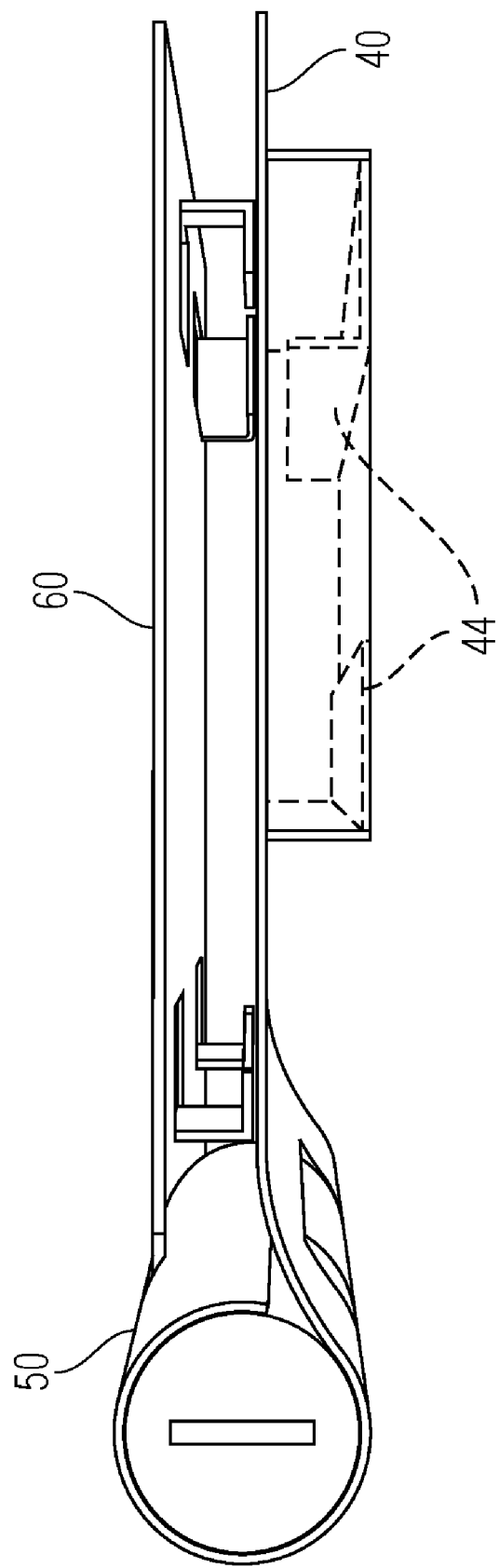
FIG. 6 shows a right side perspective view of the docking station of FIG. 1 in a closed position.

As shown in FIG. 6, the connector 50 can be arranged to allow the mounting tray 60 to pivot and fold down so as to be in substantial contact with the keyboard tray 40. In this position, the docking station 20 can be readily carried for mobile flexibility with or without the media device 100 and keyboard being secured on the docking station 20.

The holder 20 of the present teachings can be made various materials, such as, for example, plastic, metal, or combinations thereof. Materials that can be used include stainless steel, aluminum (brushed aluminum), polymers, composites, and the like. In a preferred embodiment, the holder 20 can be made from hard plastic or brushed aluminum, or a combination thereof. For parts made from plastic, they can be made by an injection molding process. Moreover, one or more portions of the holder 20 of the present teachings can be made from recycled materials.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A holder for an oblong-shaped device comprising:
   a mounting tray; and
   a mounting bracket assembly arranged on the mounting tray;
   wherein the mounting bracket assembly includes a base mounting bracket, a first upper mounting bracket, and a second upper mounting bracket;
   wherein a projecting member of the first upper mounting bracket extends substantially perpendicular with respect to a projecting member of the second upper mounting bracket;
   wherein a projecting member of the base mounting bracket extends substantially parallel with respect to a projecting member of the first upper mounting bracket;
   wherein a first distance, W, as measured between the parallel extending projecting members of the base mounting bracket and of the first upper mounting bracket is substantially equal to a second distance, W, as measured between an end of the projecting member of the first upper mounting bracket and the projecting member of the second upper mounting bracket; and
   wherein the mounting bracket assembly is configured such that the oblong-shaped device is securable to the mounting tray in both (i) a first position where a longitudinal axis of the oblong-shaped device extends substantially horizontally, and (ii) a second position where the longitudinal axis of the oblong-shaped device extends substantially vertically while the mounting tray is in a substantially upright position.

2. A holder for an oblong-shaped device comprising:
   a mounting tray; and
   a mounting bracket assembly arranged on the mounting tray;
   wherein the mounting bracket assembly is configured such that the oblong-shaped device is securable to the mounting tray in both (i) a first position where a longitudinal axis of the oblong-shaped device extends substantially horizontally, and (ii) a second position where the longitudinal axis of the oblong-shaped device extends substantially vertically while the mounting tray is in a substantially upright position; and
   wherein the mounting bracket assembly is non-adjustably arranged on the mounting tray.

3. The holder of claim 2, further comprising a keyboard tray.

4. The holder of claim 3, further comprising a connector arranged to pivotally connect the keyboard tray to the mounting tray.

5. A docking station comprising:
   a keyboard tray;
   a mounting tray including a mounting bracket assembly arranged thereon; and
   a connector arranged to pivotally connect the keyboard tray to the mounting tray;
   wherein the mounting bracket assembly includes a base mounting bracket, a first upper mounting bracket, and a second upper mounting bracket;
   wherein a projecting member of the first upper mounting bracket extends substantially perpendicular with respect to a projecting member of the second upper mounting bracket;
   wherein a projecting member of the base mounting bracket extends substantially parallel with respect to a projecting member of the first upper mounting bracket;
   wherein a first distance, W, as measured between the parallel extending projecting members of the base mounting bracket and of the first upper mounting bracket is substantially equal to a second distance, W, as measure between an end of the projecting member of the first upper mounting bracket and the projecting member of the second upper mounting bracket; and
   wherein the mounting bracket assembly is configured such that an oblong-shaped device is securable to the mounting tray in both a landscape mode and a portrait mode while the mounting tray is kept stationary.

6. A docking station comprising:
a keyboard tray;
a mounting tray including a mounting bracket assembly arranged thereon; and
a connector arranged to pivotally connect the keyboard tray to the mounting tray;
wherein the mounting bracket assembly is configured such that an oblong-shaped device is securable to the mounting tray in both a landscape mode and a portrait mode while the mounting tray is kept stationary; and
wherein the mounting bracket assembly is non-adjustably arranged on the mounting tray.

7. The docking station of claim 6, wherein the mounting bracket assembly is configured such that the oblong-shaped device is securable in the landscape mode on the mounting bracket by sliding the oblong-shaped device in a substantially horizontal direction along a longitudinal axis thereof onto the mounting bracket assembly.

8. The docking station of claim 6, wherein the mounting bracket assembly is configured such that the oblong-shaped device is securable in the portrait mode on the mounting bracket by sliding the oblong-shaped device in a substantially vertical direction along a longitudinal axis thereof onto the mounting bracket assembly.

9. A docking station for an oblong-shaped device comprising:
a keyboard tray;
a mounting tray including a mounting bracket assembly arranged thereon; and
a connector arranged to pivotally connect the keyboard tray to the mounting tray;
wherein the mounting bracket assembly includes a base mounting bracket, a first upper mounting bracket, and a second upper mounting bracket;
wherein a projecting member of the first upper mounting bracket extends substantially perpendicular with respect to a projecting member of the second upper mounting bracket;
wherein a projecting member of the base mounting bracket extends substantially parallel with respect to a projecting member of the first upper mounting bracket;
wherein a first distance, W, as measured between the parallel extending projecting members of the base mounting bracket and of the first upper mounting bracket is substantially equal to a second distance, W, as measure between an end of the projecting member of the first upper mounting bracket and the projecting member of the second upper mounting bracket; and
wherein the mounting bracket assembly is configured such that the oblong-shaped device is securable to the mounting tray in both (i) a first position where a longitudinal axis of the oblong-shaped device extends substantially horizontally, and (ii) a second position where the longitudinal axis of the oblong-shaped device extends substantially vertically while the mounting tray is kept in a substantially upright position.

10. A docking station for an oblong-shaped device comprising:
a keyboard tray;
a mounting tray including a mounting bracket assembly arranged thereon; and
a connector arranged to pivotally connect the keyboard tray to the mounting tray;
wherein the mounting bracket assembly is configured such that the oblong-shaped device is securable to the mounting tray in both (i) a first position where a longitudinal axis of the oblong-shaped device extends substantially horizontally, and (ii) a second position where the longitudinal axis of the oblong-shaped device extends substantially vertically while the mounting tray is kept in a substantially upright position; and
wherein the mounting bracket assembly is non-adjustably arranged on the mounting tray.

* * * * *